(12) United States Patent
Muradov et al.

(10) Patent No.: US 7,691,182 B1
(45) Date of Patent: Apr. 6, 2010

(54) PROCESS FOR HYDROGEN PRODUCTION VIA INTEGRATED PROCESSING OF LANDFILL GAS AND BIOMASS

(75) Inventors: Nazim Z. Muradov, Melbourne, FL (US); Franklyn Smith, Orlando, FL (US); Ali Tabatabaie-Raissi, Melbourne, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 571 days.

(21) Appl. No.: 11/637,552

(22) Filed: Dec. 12, 2006

(51) Int. Cl.
*B01D 53/02* (2006.01)

(52) U.S. Cl. .............. 95/96; 95/149; 95/228; 95/236; 95/237; 96/108; 422/169; 422/177; 55/315

(58) Field of Classification Search ........ 95/96, 95/107, 149, 228, 236, 237; 55/315; 96/108; 422/169, 177
See application file for complete search history.

(56) References Cited

U.S. PATENT DOCUMENTS

| | | | |
|---|---|---|---|
| 5,676,727 A | 10/1997 | Radlein et al. | 71/12 |
| 5,795,666 A | 8/1998 | Johnssen | 429/17 |
| 6,890,671 B2 | 5/2005 | Ruche et al. | 429/17 |
| 6,929,680 B2 * | 8/2005 | Krushnevych et al. | 95/93 |
| 6,938,439 B2 | 9/2005 | Wikstron et al. | 62/606 |
| 2004/0265651 A1 | 12/2004 | Steinberg | 429/13 |
| 2006/0024538 A1 | 2/2006 | Steinberg | 429/17 |

FOREIGN PATENT DOCUMENTS

WO    WO/00/04112    1/2000

OTHER PUBLICATIONS

Rostrup-Nielsen, J.R., and Bak Hansen, J-H., "$CO_2$—Reforming of Mehtane over Transition Metals," Journal of Catalysis, vol. 144, (1993), pp. 38-49.

Chornet, E., Wand, D., Czernik, D., Montane, and Mann, M., "Biomass-To-Hydrogen Via Fast Pyrolysis and Catalytic Stream Reforming," Proceedings of the 1996 U.S. DOE Hydrogen Program Review, vol. I, May 1-2, 1996, pp. 457-480.

(Continued)

*Primary Examiner*—Robert A Hopkins
(74) *Attorney, Agent, or Firm*—Brian S. Steinberger; Joyce Morlin; Law Offices of Brian S. Steinberger, P.A.

(57) ABSTRACT

Hydrogen production is provided via integrated closed-loop processing of landfill gas (LFG) and solid biomass feedstocks such as various agricultural wastes with minimal environmental impact. LFG is purified of harmful contaminants over a bed of activated charcoal (AC) and is catalytically reformed to synthesis gas, which is further processed to pure hydrogen via CO-shift and pressure-swing adsorption stages. Biomass is gasified in the presence of steam with production of a producer gas and AC. The producer gas is mixed with LFG and is processed to hydrogen as described above. High-surface area AC produced in the gasifier is used for the purification of both LFG and producer gas. An integrated processing of LFG and biomass offers a number of advantages such as a high overall energy efficiency, feedstock flexibility, substantial reduction in greenhouse gas emissions and production of value-added product-biocarbon that can be used as a soil enhancer.

23 Claims, 1 Drawing Sheet

OTHER PUBLICATIONS

Glaser, B., Lehmann, J. and Zech, W., "Ameliorating Physical and Chemical Properties of Highly Weathered Soils in the Tropics with Charcol- a review," Biol. Fertil. Soils, vol. 35, (2002) pp. 219-230.

Muradov, Nazim, "On-Site Production of Hydrogen from Hydrocarbon Fuels with Minimal Greenhouse Gas Emissions," Fuel Chem. Division Preprints, (2002), vol. 47(1), 2 pages.

Dalai, A.K., Sasaoka, E., Hikita. H., and Ferdous, D., "Catalytic Gasificationof Sawdust derived from Various Biomass," Energy & Fuels, (2003), vol. 17, pp. 1456-1463.

O'Malley, P.G., "Microturbines Provide Big Potential for Opportunity Fuels," Distributed Energy, Jan./Feb. 2004, pp. 34-37.

Keating, J., "Cheaper Energy by Going to Waste," Distributed Energy, Jan./Feb. 2004, pp. 22-25.

Muradov, N.Z., and Veziroglu, T.N., "From Hydrocarbon to Hydrogen-Carbon to Hydrogen Economy," Internation Journal of Hydrogen Energy, vol. 30 (2005) pp. 225-237.

Muradov, N.Z., Smith, F., Huang, C., and T-Raissi, A., "Autothermal Catalytic Pyrolysis of Mehtane As A New Route to Hydrogen Production with Reduced $CO_2$ Emissions," Internation Journal of Hydrogen Energy, vol. 116 (2006) pp. 281-288.

LFG to Power with $CO_2$ Wash, [online] Acrion, Landfill Gas to Power with Acrion's CO2 Wash Process, 2 pages, [retrieved on Sep. 1, 2006] Retrieved from http://www.acrion.com/Power.htm.

Hydrogen Production and Carbon Sequestration, [online] Eprida, Eprida is set to begin 1000 hour production of hydrogen from biomass, [retrieved on Dec. 4, 2006], Retrieved from: http://www.eprida.com/hydro/Page_files/hyromain.htm.

* cited by examiner

PROCESS FOR HYDROGEN PRODUCTION VIA INTEGRATED PROCESSING OF LANDFILL GAS AND BIOMASS

The present invention is related to hydrogen production methods, and, in particular, to a process for production of hydrogen via integrated processing of biomass-derived feedstocks such as landfill gas, biogas, wood, agricultural wastes, animal wastes, and certain types of municipal solid waste, e.g., urban wood waste, paper, biological and vegetative waste.

BACKGROUND AND PRIOR ART

Hydrogen is universally considered a fuel of the future due to environmental advantages over conventional (i.e., fossil-based) fuels.

As reported by N. Z. Muradov and T. N. Veziroglu in "From hydrocarbon to hydrogen-carbon to hydrogen economy" *International Journal of Hydrogen Energy* 30 (2005)225-237 in the near- to medium-term, hydrogen production is likely to continue to rely on fossil fuels, that are still abundantly available, relatively low cost and with an existing infrastructure for delivery and distribution. However, fossil-based fuels are considered finite, and are the main source of air pollution, producing $CO_2$, $NO_x$, $SO_x$ and other pollutants that cause considerable damage to the environment.

In contrast, renewable energy sources, such as landfill gas and biomass that includes wood, agricultural wastes and the like, are considered infinite; they contain appreciable quantities of hydrogen, oxygen and carbon and can be used as a fuel, which is carbon-neutral. Thus, it is considered wiser and more desirable to obtain hydrogen from renewable energy sources.

In principle, hydrogen can be produced from landfill gas (LFG) or biogas via three routes, after preliminary removal of potentially harmful ingredients such as sulfur-, silicon- and halide-containing compounds.

For example, in one method, LFG is first combusted in a turbine or internal combustion engine producing electricity, followed by the electrolytic dissociation of water to hydrogen and oxygen. The use of LFG as a fuel in microturbines for producing electricity is discussed by Penelope G. O'Malley in "Microturbines Provide Big Potential for Opportunity Fuels" *Distributed Energy* January/February 2004 34-37 with many lessons learned. However, the overall efficiency for converting LFG to hydrogen via this route is less than 20% and it is unlikely to be of practical importance.

In another method, methane is first extracted from LFG and used as a feedstock for hydrogen production via conventional steam methane reforming (SMR) or other processes. This method has been explored in several publications and patents. In WO 2000/004112, Jan. 27, 2000, Hall teaches the process for production of hydrogen-containing gaseous stream from LFG. After methane is separated from LFG, it is catalytically reformed to hydrogen. Janis Keating in "Cheaper Energy by Going to Waste" *Distributed Energy* 22-25 January/February 2004, describes how methane gas is scrubbed at the landfill, compressed and fed through a pipeline to a BMW plant in South Carolina; where methane is burned as a fuel.

Acrion Technologies Inc. (ATI) has developed a multi-step $CO_2$-Wash™ process for hydrogen production from LFG, as described under the topic, "Landfill Gas to Power with Acrion's $CO_2$ Wash Process." at website: http://www.acrion.com/Power.htm. First, LFG is cryogenically separated into methane and $CO_2$ stream, then methane is converted to hydrogen via conventional SMR process. Thus, the technical approach according to the methane extraction method is complex, multi-step and energy intensive. In many cases, this method may not be economically and/or environmentally advantageous, especially when the resources are not large enough or the sources are located in remote areas.

In a third method, LFG is directly reformed to synthesis gas followed by carbon monoxide (CO)-shift reaction and hydrogen recovery and purification. At this time, it appears more advantageous to directly convert or reform landfill gas (LFG) into hydrogen gas via the third method, i.e., direct reforming because it obviates the need for costly and energy intensive recovery of methane from LFG. There is a very little information in the literature on the subject of hydrogen production from LFG, biogas, digester gas, or any other bio-derived methane-containing gas via direct reforming.

Muradov et al studied direct reforming of LFG without oxygen and in the presence of oxygen as reported in "Hydrogen Production via Catalytic Processing of Renewable Feedstocks", *Proc. World Hydrogen Energ Conf.* Lyon, France, (Jun. 13, 2006). The authors showed that LFG-mimicking gas could be efficiently converted into hydrogen using transition metal-based catalysts.

The technical difficulties associated with the direct catalytic reformation of LFG or biogas stem mainly from two factors. First, there is a presence of potentially harmful impurities, such as, sulfur-, nitrogen-, silicon- and halogen-containing compounds that could easily deactivate catalysts. Second, the gas source is non-uniform. As a result, despite the fact that extensive resources and quantities of LFG and biogas are available, no large-scale commercial hydrogen production process has been implemented yet.

Biomass is another promising renewable resource for a renewable-based hydrogen production. Of particular importance are various agricultural wastes, wood chips, grass, algae, and the like. Such biomass resources represent an immense, practically inexhaustible, inexpensive and environmentally friendly source for the production of hydrogen. Although the energy use of biomass, for example, for heat and electricity generation is a well-established technology, no information is available on sufficiently large-scale biomass-to-hydrogen projects.

Dalai et al in "Catalytic Gasification of Sawdust Derived from Various Biomass," *Energy & Fuels*, 17, 1456-1463, (2003) studied catalytic gasification of biomass materials including Cedar, Aspen, cellulose in the presence of CaO catalyst at temperatures up to 850° C. The main products of gasification were hydrogen ($H_2$), carbon monoxide (CO), methane ($CH_4$) and carbon dioxide ($CO_2$). The gaseous product has to be further processed to produce pure hydrogen.

In "Biomass-to-Hydrogen via Fast Pyrolysis and Catalytic Steam Reforming", *Proc. 1996 US DOE Hydrogen Program Review*, vol. 1, p. 457, Miami, Fla., (1996) Chornet et al. reported on the development of the process for hydrogen production via fast pyrolysis of biomass with subsequent catalytic steam reforming.

The following patents disclose methods for the production of hydrogen from biomass or solid waste materials.

U.S. Pat. No. 5,795,666 to Johnssen describes a modular power station using biomass material for a fuel source for the production primarily of hydrogen from solar energy and a method of generating electric energy.

U.S. Pat. No. 6,938,439 to Wikstrom et al. provides a system for use of land fills and recyclable materials involving the separation of landfill gas (LFG) into three streams: methane, $CO_2$ and a residue stream that is commercially unsuitable.

U.S. Patent Publication 2004/0265651 to Steinberg describes a combined-cycle energy, carbon and hydrogen production process using carbonaceous materials, including biomass.

U.S. Patent Publication 2006/0024538 to Steinberg describes an integrated plasma fuel cell process from fossil or biomass fuels with minimal carbon dioxide emissions.

The above processes involve energy intensive systems of cleaning landfill gas (LFG), separating LFG into various streams, plasma decomposition processes, use of high temperatures and pressures to achieve the conversion of either LFG or biomass material to hydrogen. There is a need for a simplified, integrated process that combines several disparate waste sources, such as, LFG, a gas and biomass, a solid to increase energy efficiency and produce high purity hydrogen.

The present invention improves upon and overcomes many of the deficiencies of the prior art.

SUMMARY OF THE INVENTION

A primary objective of the present invention is to develop a continuous process for hydrogen production via processing of renewable methane-containing gases, such as, landfill gas (LFG) and biomass feedstocks.

A second objective of the invention is to integrate the processing of two types of feedstocks, such as a gas, LFG and a solid, biomass, in order to simplify the technological chain of the process.

A third objective of the invention is to accomplish a close-loop operation where byproducts of a first process are efficiently utilized in a second process.

A fourth objective is to significantly reduce an environmental footprint of the technology by eliminating harmful emissions and undesirable solid/liquid byproducts.

A fifth objective is to produce high purity hydrogen via integrated closed-loop processing of landfill gas and biomass feedstocks with minimal environmental impact.

A preferred method for producing hydrogen by the integrated closed-loop processing of landfill gas and biomass feedstocks includes selecting a first input for landfill gas feedstock containing moisture, selecting a second input for biomass feedstock, directing the landfill gas from the first input into a vessel to remove moisture therefrom before the reduced-moisture landfill gas is directed to a scrubber with a first inlet and second inlet, a first outlet and a second outlet with a carbon product as a purifying/cleaning agent, transporting biomass material from the second input to a gasifier that reduces the biomass to a producer gas and a carbon product, directing the producer gas of step to a stream containing the reduced-moisture landfill gas so that the producer gas and reduced-moisture landfill gas travel together to the first inlet of the scrubber and simultaneously directing the biomass-derived carbon product to the second inlet of the scrubber for use as the gas purifying agent, scrubbing the producer gas and the reduced-moisture landfill gas in the scrubber until the producer gas and reduced-moisture landfill gas are free of a plurality of undesirable impurities and produce an outgoing stream of a purified mixture containing predominantly hydrogen ($H_2$), methane ($CH_4$), carbon monoxide (CO) and carbon dioxide ($CO_2$), then, directing the outgoing stream of the purified mixture of hydrogen ($H_2$), methane ($CH_4$), carbon monoxide (CO) and carbon dioxide ($CO_2$) to a reformer where the outgoing stream is processed to synthesis gas which is a mixture of hydrogen and carbon monoxide ($H_2$ and CO) in the presence of steam, cooling the synthesis gas and directing the cooled synthesis gas to a water gas shift reactor where the carbon monoxide is converted to a mixture of carbon dioxide and additional hydrogen ($H_2$), directing the mixture of carbon dioxide and hydrogen to a pressure swing adsorption (PSA) unit with a first outlet and a second outlet for a final gas separation and purification stage, and collecting a high purity hydrogen gas from a first outlet and a stream of the PSA off-gas from a second outlet for use as a fuel in the burner used to heat the catalytic reformer.

The preferred method further includes the step of removing the spent carbon product from the scrubber for use as a bio-carbon soil enhancer. It is also preferred that the carbon product used as a purifying agent in the scrubber is biomass-derived activated charcoal from the gasifier of the present process.

It is preferred that the biomass feedstock is selected from citrus waste, sugarcane bagasse, wood, agricultural waste, animal waste, solid municipal biological and vegetative waste and mixtures thereof.

The preferred gasifier for reducing the biomass feedstock is operated in a temperature range of from approximately 400° C. to approximately 850° C. and pressure of from approximately 1 atmosphere to approximately 20 atmospheres of pressure in the presence of an oxidant, preferably, selected from oxygen, and steam.

It is preferred that the carbon product used in the scrubber is the biomass-derived activated charcoal from the gasifier. The preferred reformer is a catalytic reformer that operates at 800-1000° C. and pressures of 10-40 atm wherein the preferred catalyst is carried on a support and is at least one of Ru (0.1-10 wt. %) or Ir (0.1-10 wt. %) or Pt (0.1-10 wt. %) or Rh (0.1-10 wt. %) or Pd (0.1-10 wt. %) or NiO(1-50 wt. %). The preferred catalyst support is alumina ($Al_2O_3$), although a person skilled in the art may envision the use of other support materials.

The hydrogen gas produced by the preferred process has a purity of at least 99.99 volume %.

A preferred system for producing hydrogen by an integrated closed-loop processing of landfill gas and biomass feedstocks includes a first input for landfill gas feedstock containing moisture that leads to a first pipeline, a second input for biomass feedstock that is transported to a gasifier, a vessel to remove moisture from the landfill gas before the reduced-moisture landfill gas is transported in the first pipeline to a scrubber that uses carbon product as a purifying agent until the carbon product is spent.

The preferred scrubber has a first inlet and second inlet, a first outlet and a second outlet and the gasifier reduces the biomass of b) to a producer gas and a biomass-derived carbon product. The producer gas is transported to the first pipeline containing the reduced-moisture landfill gas so that the producer gas and reduced-moisture landfill gas travel as a mixture to the first inlet of the scrubber and the biomass-derived carbon product is transported in a transporter to the second inlet of the scrubber for use as the gas purifying agent.

The preferred system has a scrubber that cleans the producer gas and the reduced-moisture landfill gas until the producer gas and reduced-moisture landfill gas are free of a plurality of undesirable impurities and produce an outgoing stream of a purified gas mixture containing hydrogen ($H_2$), methane ($CH_4$), carbon monoxide (CO) and carbon dioxide ($CO_2$).

The first pipeline of the preferred system transports the outgoing stream of the purified mixture of hydrogen ($H_2$), methane ($CH_4$), carbon monoxide (CO) and carbon dioxide ($CO_2$) to a reformer where the outgoing stream is processed to synthesis gas which is a mixture of hydrogen and carbon monoxide ($H_2$ and CO) in the presence of steam, then a heat exchanger in the first pipeline cools the synthesis gas as the synthesis gas exits the reformer to the first pipeline that transports the cooled synthesis gas to a water gas shift reactor where the carbon monoxide is converted to a mixture of carbon dioxide and hydrogen ($H_2$), the first pipeline then transports the mixture of carbon dioxide and hydrogen of h) to a pressure swing adsorption (PSA) unit with a first outlet and a second outlet for a final gas separation and purification stage, and a high purity hydrogen gas is collected from the first outlet of the PSA unit and an off-gas stream is transported from the second outlet of the PSA unit for use as a fuel in the reformer burner.

The preferred system further includes removing the spent carbon product from the second outlet of the scrubber for use as a biocarbon soil enhancer. It is also preferred that the carbon product used as a purifying agent in the scrubber is biomass-derived activated charcoal, more preferably, the carbon product from the gasifier used to reduce the biomass.

The preferred biomass feedstock is at least one of citrus waste, sugarcane bagasse, wood, agricultural waste, animal waste, solid municipal biological and vegetative waste or mixtures thereof.

The preferred gasifier used in processing biomass is operated in a temperature range of from approximately 400° C. to approximately 850° C. and pressure of from approximately 1 atmosphere to approximately 20 atmospheres of pressure in the presence of an oxidant; preferably oxygen or steam.

The preferred reformer is a catalytic reformer, wherein the catalyst is at least one of Ru (0.1-10 wt. %) or Ir (0.1-10 wt. %) or Pt (0.1-10 wt. %) or Rh (0.1-10 wt. %) or Pd (0.1-10 wt. %) or NiO(1-50 wt. %) carried on a support, preferably aluminum oxide ($Al_2O_3$) support.

The preferred system produces hydrogen gas with a purity of at least 99.99 volume %.

A preferred system for producing hydrogen with the integrated closed-loop processing of landfill gas and biomass feedstocks includes a first input for landfill gas feedstock containing moisture, a second input for a solid biomass feedstock that is transported to a gasifier and reduced to a producer gas and a biomass-derived carbon product, a vessel to remove moisture from the landfill gas, a pipeline that combines the producer gas with the reduced-moisture landfill gas to form a gaseous mixture that is fed to a scrubber, a first inlet of the scrubber that receives the gaseous mixture and a second inlet of the scrubber that receives the biomass-derived carbon product for use as the gas purifying agent.

In the preferred system, a first outlet of the scrubber releases a scrubbed gaseous mixture that is free of a plurality of undesirable impurities and is an outgoing stream of a purified gas mixture containing predominantly hydrogen ($H_2$), methane ($CH_4$), carbon monoxide (CO) and carbon dioxide ($CO_2$) and a second outlet of the scrubber releases a spent biocarbon product for use as a biocarbon soil enhancer.

The preferred system has a reformer that receives the outgoing stream of a purified gas mixture and processes the purified gas mixture to synthesis gas in the presence of steam, then a water gas shift reactor receives the synthesis gas where the carbon monoxide is converted to a mixture of carbon dioxide and hydrogen ($H_2$), then a pressure swing adsorption (PSA) unit with a first outlet and a second outlet receives the mixture of carbon dioxide and hydrogen for a final gas separation and purification stage, and a high purity hydrogen gas is collected from the first outlet of the PSA unit and an off-gas stream is transported from the second outlet of the PSA unit to the reformer for use as a fuel in the reformer burner.

Further objects and advantages of the present invention will be apparent from the following detailed description of a presently preferred embodiment which is illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The phrase "landfill gas" is used to describe a combustible gas resulting from natural decomposition of organic material at landfill disposal sites and having usable methane content.

The term, "biogas" is used for a methane-containing gas derived from decomposing biological waste, such as manure under anaerobic conditions.

The term, "digester gas" is used to describe a type of biogas generated in an airtight vessel in which bacteria decomposes biomass in water.

The term, "biomass" is a general term denoting all regenerative raw materials, such as materials which can be repeatedly produced by biological means, at a substantially predictable production rate depending on the vegetation periods of a region. Biomass feedstocks include citrus waste, sugarcane bagasse, forest residue, wood chips, animal waste, agricultural waste and solid municipal vegetation waste.

The term, "producer gas" is used to describe a gas produced by gasification of biomass in the presence of oxidants such as air, oxygen, steam or the combination thereof. The producer gas typically consists of the mixture of hydrogen, carbon monoxide, carbon dioxide, nitrogen, methane and small amounts of volatile organic compounds.

The present invention is based on the integration of two processes. First, the direct reforming of LFG to synthesis gas followed by gas conditioning, hydrogen recovery and purification, and second, gasification/pyrolysis of biomass to the producer gas, which is combined with the LFG and processed in the same manner as LFG.

Figure 1:
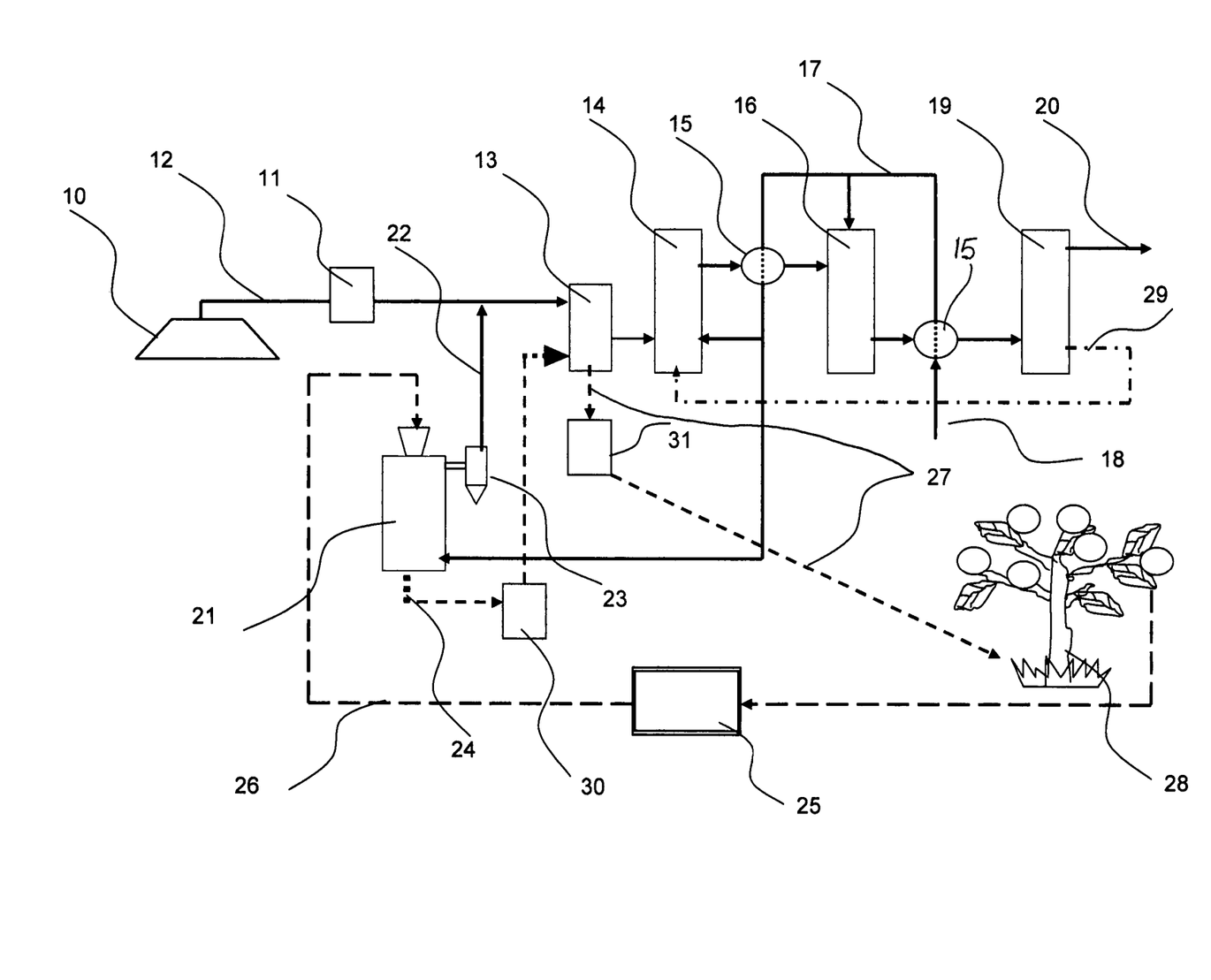
The sole FIGURE shows simplified schematics of hydrogen production via integrated closed-loop processing of landfill gas and citrus waste.

The sole FIGURE depicts the schematic diagram of the present invention showing the integrated processing of LFG and biomass, such as, citrus waste. Landfill gas 12 generated by a landfill 10 is first treated in the vessel 11 where excess water is removed from the LFG. Then, LFG is directed to a scrubber 13 where potentially harmful components (e.g., sulfur-, halogen- and silicon-containing compounds) are removed from the gas before the reforming stage in order to prolong the life of the catalysts used in the process. Existing off-the-shelf scrubbing technologies, such as, scrubbers based on activated carbon or molecular sieve adsorbents can efficiently remove the impurities from LFG down to ppm levels. Since there is no need for the removal of $CO_2$ from the LFG before reforming, the proposed approach offers certain economical advantages over competing technologies, particularly, those involving cryogenic separation of $CO_2$, such as, the $CO_2$-Wash™ process of Acrion Technologies discussed on the website: http://www.acrion.com/home.htm.

All apparatuses and processes in the system work continuously, except the scrubber 13 that is periodically loaded with fresh charcoal 24, preferably from the gasifier 21. The charcoal 24 is preferably stored in a storage vessel 30 until the scrubber 13 requires a fresh load of activated charcoal.

The purified LFG which is predominantly $CH_4$—$CO_2$ mixture enters the catalytic reformer 14, where it is processed to synthesis gas (or syngas, which is predominantly a mixture of $H_2$ and CO) via the process called $CO_2$-reforming or "dry" reforming of methane according to the following equation:

$$CH_4 + CO_2 \rightarrow 2H_2 + 2CO \quad \Delta H° = 247 \text{ kJ/mol} \tag{1}$$

"Dry" reforming is a well-studied reaction as discussed by J. Rostrup-Nielsen and J. Bak Hansen in "$CO_2$-Reforming of Methane over Transition Metals", *Journal of Catalysis*, 144, p. 38-49, 1993. In this paper, the authors compare various catalysts used in $CO_2$-reforming of methane. However, there is one serious problem associated with direct catalytic reforming of LFG via the reaction (1), namely, the catalyst deactivation due to carbon deposition.

Since in most cases, methane is a predominant component in LFG wherein the methane concentration is higher than that of $CO_2$, methane is easily decomposed over the reforming catalysts, such as, Ni catalysts, producing carbon deposits that block active sites of the catalyst leading to its rapid deactivation. To prevent the catalyst deactivation, a certain amount of steam 17 has to be introduced into the reformer 14.

The reforming reactor 14 operates at 800-1000° C. and pressures of 10-40 atm and the steam to methane ratio of about 1:1. Syngas is cooled in a heat exchanger 15 to about 400° C. and further processed in the CO-shift (or water-gas shift) reactor 16 where CO is converted into $CO_2$ and additional $H_2$ according to the following equation:

$$CO + H_2O \rightarrow H_2 + CO_2 \quad \Delta H° = -41.5 \text{ kJ/mol} \tag{2}$$

Steam 17 for the reformer 14 and CO-shift reactor 16 is produced from water 18 passing through heat exchangers 15. At the final gas separation and purification stage of the process, hydrogen gas 20 is recovered from $H_2$—$CO_2$ mixture using a pressure swing adsorption (PSA) unit 19.

LFG feedstock is augmented by the gas 22 generated from a biomass feedstock 26 in a gasifier 21. The biomass feedstock 26 depicted in the sole FIGURE is an agricultural waste produced by processing of citrus fruit 28 at a specialized facility 25. As it is readily understood by persons skilled in the art, any other fruit or vegetable or cellulosic waste may be used.

Biomass gasification can be conducted in two modes differing in the use of an oxidizer and operating conditions. First, complete gasification of the biomass resulting in producer gas and an inorganic ash may be used. Second, incomplete gasification resulting in producer gas and a carbonaceous product, such as, activated charcoal that can be used in a scrubber.

The biomass gasification process of the present invention is conducted at the temperature range of approximately 400 to approximately 850° C. and pressure of approximately 1 to approximately 20 atmospheres with steam, or oxygen or combination thereof as oxidants. Air can also be used as an oxidant, but this will result in dilution of the product gas with nitrogen and consequently more complex gas separation stage. The gas 22 produced during biomass gasification (called "producer gas") may contain small particles of tar and solids that are removed in the filter 23. The producer gas 22 typically represents a mixture of $H_2$, $CH_4$, CO, $CO_2$ and $C_2+$ hydrocarbons and sometime minute amounts of sulfur- and nitrogen-containing compounds. The producer gas 22 is mixed with the LFG 12 and purified of impurities, such as, hydrogen sulfide ($H_2S$), ammonia ($NH_3$), and the like, in the scrubber 13. The mixture of purified producer gas and LFG is processed in the reformer and further in the CO-shift reactor and PSA unit as discussed above. Hydrogen produced in this process has the purity of 99.999 vol. %, which meets stringent requirements for a variety of applications, including those of fuel cell vehicles. A stream of offgas (or tailgas) 29 containing $CO_2$, CO, $H_2$, $CH_4$ and other minor components exits the PSA unit and can be used as a fuel for the burner in the reformer 14.

In the preferred embodiment of the present invention, biomass gasification is conducted in the presence of steam resulting in the production of two valuable products: producer gas 22 and charcoal 24. The biomass-derived charcoal or biocarbon produced in the process has relatively high-surface area comparable to that of activated carbon (AC).

Advantageously, biocarbon produced in the biomass gasifier can be stored in a storage vessel 30 until needed and is efficiently utilized in the scrubber 13 and the filter 23 that purifies both LFG and the producer gas; thus, eliminating the need for an additional expensive adsorbent. Similarly, when the charcoal is depleted or spent, it is dislodged from the scrubber and stored in a storage vessel 31 until sufficient bulk is accumulated for use as a soil enhancer.

Another advantage of the closed-loop integrated scheme is that the biomass gasifier can use the surplus steam generated during LFG processing, thus avoiding a special energy-intensive steam generator.

After a certain period of operation, depending on the level of impurities in LFG and the producer gas, activated charcoal in the scrubber and the filter may be depleted and will have to be replaced with a fresh charcoal 24. In this case, the depleted charcoal 27 is taken from the storage vessel 31 and can be used for the amelioration of soil in order to increase the crop yield. In addition to the microelements and minerals already existing in the biocarbon, such as, potassium and phosphorus, it will acquire or adsorb a variety of compounds that may act as nutrients for plants, such as, ammonia, sulfur compounds, and the like.

Recent studies indicated that adding charcoal to soil can significantly increase seed germination, plant growth and crop yields. Crop yields could be increased by up to 200% according to Glaser B, Lehmann J, Zech W. in "Ameliorating Physical and Chemical Properties of Highly Weathered Soils in the Tropics with Charcoal—A Review". *Biol. Fert. Soils* 2002; 35:219. Studies showed that the application of charcoal to soil increases its nutrient and water retention capacities, supports microbial communities and activates the root activity, thus promoting biomass growth.

Charcoal was also shown to be a basis for an efficient slow released fertilizer in "Renewable Hydrogen Production and $CO_2$ Sequestration." EPRIDA web site. www.eprida.com/hydro/ecoss.htm, 2003 and in U.S. Pat. No. 5,676,727 to Radlein et al. Due to the enhanced nutrient-holding capacity of the carbon-amended soils, the amount of fertilizers applied to soil could be substantially reduced, resulting in an additional economic gain.

The addition of carbon products to soil may have multiple favorable effects on the reduction of atmospheric $CO_2$ through the enhancement of $CO_2$ absorption by plants and via reduction of $CO_2$ emissions from soil to the atmosphere. Due to its recalcitrant nature, carbon entering the soil is a significant long-term sink for $CO_2$ and may be important for global carbon sequestration. By way of explanation, this means that due to its relative inertness, carbon can adsorb and retain $CO_2$ in soil for the extensive period of time, thus acting as a $CO_2$ sink.

The examples below are non-limiting and for illustration purposes only. Other uses of the invention will be apparent from the disclosure to one skilled in the art.

Example 1

Catalytic reforming of the gaseous mixture $CH_4$—56.9 vol. % and $CO_2$—43.1 vol. % (molar ratio of $CH_4/CO_2$=1.3) was conducted in this experiment. This gaseous mixture mimics that of LFG from the landfill site in Cocoa, Fla. For the sake of simplicity, $N_2$, $O_2$ and minor ingredients were not included in the tested feedstock. The reforming reaction was conducted in a quartz reactor with OD=12 mm using 0.5 g of Ru (0.5 wt. %)/$Al_2O_3$ catalyst at 850° C. and atmospheric pressure. After about one hour from the start of the reaction the steady state process was established with the production of the gaseous product of the following average composition (vol. %): $H_2$—45.4, CO—44.8, $CH_4$—8.9, $CO_2$—0.9. Within the detection limits of an analyzer used, no carbon was detected on the surface of Ru-catalyst during 5 hrs with the average $CO_2$ conversion during the same period measured at 98.9%. Thus, Ru-catalyst demonstrates both high activity and selectivity for CH—$CO_2$ reforming reaction; hence, a very low activity for the methane decomposition reaction.

Example 2

The experimental conditions were similar to those of the Example 1, except NiO(1-15 wt. %)/$Al_2O_3$ was used as a catalyst. Initially, the hydrogen concentration in the effluent gas was in excess of 50 vol. %, but the reaction was not sustainable and hydrogen concentration steadily decreased during the experiment. The amount of carbon accumulated on the catalyst surface after 5 hours corresponded to a methane-to-carbon conversion yield of 15.3 mol. %. After the reaction, the catalyst completely disintegrated from pellets into a fine powder. These experimental observations evidence a major role played by methane decomposition reaction in the overall reforming process. Carbon produced by methane decomposition reaction blocks catalytic active sites causing gradual deactivation of the catalyst. Disintegration of Ni-catalyst can be explained by the growth of carbon particles inside the catalyst pores. This experiments points to high catalytic activity and low selectivity of Ni-catalyst for $CH_4$—$CO_2$ reforming since it also catalyzes methane decomposition reaction.

Example 3

The experimental condition of the reaction and the catalyst used were similar to those of the Example 2, except steam was added to the reagents in order to prevent carbon lay down on the NiO/$Al_2O_3$ catalyst surface. Steam was added to methane-$CO_2$ mixture in the amount equimolar to the quantity of methane. Thus the components of the feedstock were as follows: $CH_4:H_2O:CO_2$: =1.3:1.3:1 (molar). The addition of steam allowed sustainable reaction during 12 hrs of operation. The average concentrations of hydrogen and CO in the effluent gas were 58 and 34.5 vol. %, respectively. The $H_2$/CO ratio in the presence of steam increased appreciably compared to the experiment of the Example 2, where no steam was added (from $H_2$/CO=1.2 to 1.7). Carbon dioxide concentration in the product gas was also increased. No carbon deposits were detected on the catalyst surface after the experiment. There were no signs of Ni-catalyst disintegration after the reforming experiments involving steam.

Example 4

Citrus waste product in the form of citrus pulp pellets (CPP) was used in the experiment as a feedstock. One (1.0) gram of CPP was gasified in the presence of steam at 600-750° C. in a quartz reactor with the generation of a hydrogen-rich producer gas and a carbonaceous product with high surface area. At 750° C., the composition of the producer gas was (vol. %): $H_2$—39.4, $CH_4$—8.5, $C_2$+ hydrocarbons—2.1, CO—16.8, $CO_2$—31.0, other—2.2. The producer gas was introduced to the catalytic reforming reactor, similar to one used in the Example 3, where it was converted into hydrogen rich gas having $H_2$ concentration of 65.8 vol. %, the balance CO and $CO_2$. This gas was further treated in the shift reactor, followed by the hydrogen purifier. The purity of the resulting hydrogen gas was at least 99.9 vol. %. The carbonaceous product obtained in the biomass gasifier exhibited relatively high surface area of about 100 $m^2$/g, which is characteristic of activated carbon materials. Approximately 1 g of $H_2$ could be produced from 10 g of CPP on a dry basis. This experiment demonstrates the integrated processing of LFG and the producer gas from biomass results in the production of pure hydrogen.

For the first time, integrated closed-loop processing of LFG and biomass is provided for the production of high purity hydrogen and a biocarbon soil enhancer.

There is synergistic action in the processing of disparate waste sources, such as, LFG and biomass feedstocks that provides a more energy efficient and potentially more cost effective system than the separate processing of each waste source. There is built-in feedstock flexibility wherein any type of methane-containing gases, such as LFG, biogas, digester gas, and any biomass-based feedstocks including agricultural and municipal solid vegetation wastes can be efficiently converted to hydrogen. The present invention provides a substantial reduction in greenhouse gas emissions and criteria pollutants such as $H_2S$, $NO_x$, $SO_x$, hydrocarbons, aerosols. Another advantage of the present invention is the production of value-added product-biocarbon as a soil enhancer, which can potentially increase the crop yield, reduce the amount of fertilizers applied to soil, and have positive environmental effect, such as, reduction in atmospheric carbon dioxide ($CO_2$).

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for producing hydrogen and carbon dioxide by the integrated closed-loop processing of landfill gas and biomass feedstocks, comprising the steps of:
    a) selecting a first input for landfill gas feedstock containing moisture;
    b) selecting a second input for biomass feedstock;
    c) directing the landfill gas from the first input into a vessel to remove moisture therefrom before the reduced-moisture landfill gas is directed to a scrubber with a first inlet and second inlet, a first outlet and a second outlet with a carbon product as a purifying agent;
    d) transporting biomass material from the second input to a gasifier that reduces the biomass to a producer gas and a carbon product;
    e) directing the producer gas of step d) to a stream containing the reduced-moisture landfill gas so that the producer gas and reduced-moisture landfill gas travel together to the first inlet of the scrubber and simultaneously directing the carbon product of step d) to the second inlet of the scrubber for use as the gas purifying agent;

f) scrubbing the producer gas of step d) and the reduced-moisture landfill gas of step c) in the scrubber until the producer gas and reduced-moisture landfill gas are free of a plurality of undesirable impurities and produce an outgoing stream of a purified mixture containing predominantly hydrogen ($H_2$), methane ($CH_4$), carbon monoxide (CO) and carbon dioxide ($CO_2$);

g) directing the outgoing stream of the purified mixture of hydrogen ($H_2$), methane ($CH_4$), carbon monoxide (CO) and carbon dioxide ($CO_2$) to a reformer where the outgoing stream is processed to synthesis gas which is a mixture of hydrogen and carbon monoxide ($H_2$ and CO) in the presence of steam;

h) cooling the synthesis gas of step g) and directing the cooled synthesis gas to a water gas shift reactor where the carbon monoxide is converted to a mixture of carbon dioxide and additional hydrogen ($H_2$);

i) directing the mixture of carbon dioxide and hydrogen of step h) to a pressure swing adsorption unit with a first outlet and a second outlet for a final gas separation and purification stage; and j) collecting a high purity hydrogen gas from a first outlet and a stream of an offgas from a second outlet for use as a fuel in the reformer burner.

2. The method of claim 1, further includes the step of removing the spent carbon product of step e) for use as a biocarbon soil enhancer.

3. The method of claim 1, wherein the carbon product used as a purifying agent in the scrubber is biomass-derived activated charcoal.

4. The method of claim 1, wherein the biomass feedstock is selected from at least one of citrus waste, sugarcane bagasse, wood, agricultural waste, animal waste, solid municipal biological and vegetative waste and mixtures thereof.

5. The method of claim 1, wherein the gasifier of step d) is operated in a temperature range of from approximately 400° C. to approximately 850° C. and pressure of from approximately 1 atmosphere to approximately 20 atmospheres of pressure in the presence of an oxidant.

6. The method of claim 5, wherein the oxidant is selected from at least one of oxygen and steam.

7. The method of claim 1 wherein the carbon product of step d) is used in the scrubber.

8. The method of claim 1 wherein the reformer in step g) is a catalytic reformer.

9. The method of claim 8, wherein the catalyst used in the reformer is selected from at least one of Ru (0.1-10 wt. %) or Ir (0.1-10 wt. %) or Pt (0.1-10 wt. %) or Rh (0.1-10 wt. %) or Pd (0.1-10 wt. %) or NiO(1-50 wt. %) carried on a support.

10. The method of claim 9, wherein the support is aluminum oxide ($Al_2O_3$).

11. The method of claim 1, wherein the hydrogen gas of step j) has a purity of at least 99.99 volume %.

12. A system for producing hydrogen by the integrated closed-loop processing of landfill gas and biomass feedstocks that comprises:

a) a first input for landfill gas feedstock containing moisture into a first pipeline;

b) a second input for biomass feedstock that is transported to a gasifier;

c) a vessel to remove moisture from the landfill gas of a); before the reduced-moisture landfill gas is transported in the first pipeline to a scrubber;

d) the scrubber of c) uses carbon product as a purifying agent until the carbon product is spent, the scrubber has a first inlet and second inlet, a first outlet and a second outlet;

e) the gasifier reduces the biomass of b) to a producer gas and a biomass-derived carbon product;

e) the producer gas of d) is transported to the first pipeline containing the reduced-moisture landfill gas so that the producer gas and reduced-moisture landfill gas travel as a mixture to the first inlet of the scrubber and the biomass-derived carbon product of d) is transported in a transporter to the second inlet of the scrubber for use as the gas purifying agent;

f) the scrubber cleans the producer gas of d) and the reduced-moisture landfill gas of c) until the producer gas and reduced-moisture landfill gas are free of a plurality of undesirable impurities and produce an outgoing stream of a purified gas mixture containing hydrogen ($H_2$), methane ($CH_4$), carbon monoxide (CO) and carbon dioxide ($CO_2$);

g) the first pipeline transports the outgoing stream of the purified mixture of hydrogen ($H_2$), methane ($CH_4$), carbon monoxide (CO) and carbon dioxide ($CO_2$) to a reformer where the outgoing stream is processed to synthesis gas which is a mixture of hydrogen and carbon monoxide ($H_2$ and CO) in the presence of steam;

h) a heat exchanger in the first pipeline cools the synthesis gas of g) as the synthesis gas exits the reformer into the first pipeline that transports the cooled synthesis gas to a water gas shift reactor where the carbon monoxide is converted to a mixture of carbon dioxide and hydrogen ($H_2$);

i) the first pipeline transports the mixture of carbon dioxide and hydrogen of h) to a pressure swing adsorption (PSA) unit with a first outlet and a second outlet for a final gas separation and purification stage; and j) a high purity hydrogen gas is collected from the first outlet of the PSA unit and an off-gas stream is transported from the second outlet of the PSA unit for use as a fuel in the reformer burner.

13. The system of claim 12, further includes removing the spent carbon product of e) from the second outlet of the scrubber for use as a biocarbon soil enhancer.

14. The system of claim 12, wherein the carbon product used as a purifying agent in the scrubber is biomass-derived activated charcoal.

15. The system of claim 12, wherein the biomass feedstock is selected from at least one of citrus waste, sugarcane bagasse, wood, agricultural waste, animal waste, solid municipal biological and vegetative waste and mixtures thereof.

16. The system of claim 12, wherein the gasifier of d) is operated in a temperature range of from approximately 400° C. to approximately 850° C. and pressure of from approximately 1 atmosphere to approximately 20 atmospheres of pressure in the presence of an oxidant.

17. The system of claim 16, wherein the oxidant is selected from at least one of oxygen, and steam.

18. The system of claim 12, wherein the carbon product of d) is used in the scrubber.

19. The system of claim 12, wherein the reformer in g) is a catalytic reformer.

20. The system of claim 19, wherein the catalyst used in the reformer is selected from at least one of Ru (0.1-10 wt. %) or Ir (0.1-10 wt. %) or Pt (0.1-10 wt. %) or Rh (0.1-10 wt. %) or Pd (0.1-10 wt. %) or NiO(1-50 wt. %) carried on a support.

21. The system of claim 20, wherein the support is aluminum oxide ($Al_2O_3$).

22. The system of claim 12, wherein the hydrogen gas of j) has a purity of at least 99.99 volume %.

23. A system for producing hydrogen by the integrated closed-loop processing of landfill gas and biomass feedstocks that comprises:
 a) a first input for landfill gas feedstock containing moisture;
 b) a second input for a solid biomass feedstock that is transported to a gasifier and reduced to a producer gas and a biomass-derived carbon product;
 c) a vessel to remove moisture from the landfill gas of a);
 d) a pipeline that combines the producer gas of b) with the reduced-moisture landfill gas of c) to form a gaseous mixture that is fed to a scrubber;
 e) a first inlet of the scrubber receives the gaseous mixture of d) and the biomass-derived carbon product of b) is transported to a second inlet of the scrubber for use as the gas purifying agent;
 f) a first outlet of the scrubber releases a scrubbed gaseous mixture of d) that is free of a plurality of undesirable impurities and is an outgoing stream of a purified gas mixture containing predominantly hydrogen ($H_2$), methane ($CH_4$), carbon monoxide (CO) and carbon dioxide ($CO_2$);
 g) a second outlet of the scrubber releases a spent biocarbon product for use as a biocarbon soil enhancer;
 h) a reformer receives the outgoing stream of a purified gas mixture of f) and processes the purified gas mixture to synthesis gas in the presence of steam;
 i) a water gas shift reactor receives the synthesis gas of h) where the carbon monoxide is converted to a mixture of carbon dioxide and hydrogen ($H_2$);
 j) a pressure swing adsorption (PSA) unit with a first outlet and a second outlet receives the mixture of carbon dioxide and hydrogen for a final gas separation and purification stage; and
 k) a high purity hydrogen gas is collected from the first outlet of the PSA unit and an off-gas stream is transported from the second outlet of the PSA unit to the reformer for use as a fuel in the reformer burner.

* * * * *

UNITED STATES PATENT AND TRADEMARK OFFICE
CERTIFICATE OF CORRECTION

| | | |
|---|---|---|
| PATENT NO. | : 7,691,182 B1 | Page 1 of 1 |
| APPLICATION NO. | : 11/637552 | |
| DATED | : April 6, 2010 | |
| INVENTOR(S) | : Nazim Z. Muradov et al. | |

It is certified that error appears in the above-identified patent and that said Letters Patent is hereby corrected as shown below:

Please add the following paragraph to the first page of the Specification after the Title of the invention.

STATEMENT REGARDING FEDERALLY SPONSORED RESEARCH OR DEVELOPMENT

This invention was funded in part by NASA Glenn Research Center, grant number NAG3-2751.

Signed and Sealed this

Seventh Day of December, 2010

David J. Kappos
*Director of the United States Patent and Trademark Office*